(12) United States Patent
Hyun (10) Patent No.: US 10,271,531 B2
(45) Date of Patent: Apr. 30, 2019

(54) FISHING REEL EQUIPPED WITH REPLACEABLE HOOD TOP

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 95 days.

(21) Appl. No.: 15/493,540

(22) Filed: Apr. 21, 2017

(65) Prior Publication Data

US 2017/0303520 A1    Oct. 26, 2017

(30) Foreign Application Priority Data

Apr. 26, 2016   (KR) .................. 10-2016-0050826
Jul. 19, 2016   (KR) .................. 10-2016-0091484

(51) Int. Cl.
*A01K 89/01*      (2006.01)
*A01K 89/015*     (2006.01)
*A01K 89/00*      (2006.01)

(52) U.S. Cl.
CPC ........ *A01K 89/0192* (2015.05); *A01K 89/006* (2013.01); *A01K 89/0182* (2015.05); *A01K 89/0186* (2015.05); *A01K 89/01903* (2015.05); *A01K 89/01912* (2015.05); *A01K 89/01925* (2015.05)

(58) Field of Classification Search
CPC ............ A01K 89/0192; A01K 89/0182; A01K 89/0186; A01K 89/01925; A01K 89/01121; A01K 89/01123
See application file for complete search history.

(56) References Cited

U.S. PATENT DOCUMENTS

| 4,871,126 A | * | 10/1989 | Myojo | ............... A01K 89/0155 242/323 |
| 5,855,331 A | * | 1/1999 | Morimoto | .......... A01K 89/0186 242/310 |
| 8,882,014 B2 | * | 11/2014 | Niitsuma | ........... A01K 89/0192 242/310 |
| 2002/0185561 A1 | * | 12/2002 | Koike | .................... A01K 89/00 242/223 |

(Continued)

FOREIGN PATENT DOCUMENTS

| KR | 100320405 | 1/2002 |
| KR | 200426604 | 9/2006 |
| KR | 20130037633 | 4/2013 |

(Continued)

*Primary Examiner* — Emmanuel M Marcelo
(74) *Attorney, Agent, or Firm* — Cantor Colburn LLP (57) ABSTRACT

Provided is a fishing reel equipped with a replaceable hood top. The fishing reel includes: a frame having a mount; two side covers coupled to both sides of the frame; a spool disposed inside the mount of the frame and coupled to the side covers through a shaft; a reel foot coupled to a bottom of the frame to be mounted on a fishing rod; a hood coupled to a top of the frame; a handle coupled to a side of the frame through a shaft to rotate the spool; and a tension nut disposed on a side of the frame to adjust a casting distance by controlling a rotational speed of a spool shaft. The hood has coupling portions, and a replaceable hood top is coupled to the coupling portions.

5 Claims, 10 Drawing Sheets

(56) References Cited

U.S. PATENT DOCUMENTS

2003/0066920 A1\* 4/2003 Kitajima ................ A01K 89/00
 242/310
2015/0272103 A1\* 10/2015 Blosch ............... A01K 89/0192
 242/311

FOREIGN PATENT DOCUMENTS

| KR | 101418029 | 7/2014 |
| KR | 101492199 | 2/2015 |

\* cited by examiner

FIG. 13

FISHING REEL EQUIPPED WITH REPLACEABLE HOOD TOP

CROSS REFERENCE TO RELATED APPLICATION

The present application claims priority to Korean Patent Application No. 10-2016-0050826, filed Apr. 26, 2016, and Korean Patent Application No. 10-2016-0091484, filed Jul. 19, 2016 the entire contents of which is incorporated herein for all purposes by this reference.

BACKGROUND OF THE INVENTION

Field of the Invention

The present invention relates to a fishing reel equipped with a replaceable hood top. More particularly, the present invention relates to a fishing reel equipped with a replaceable hood top, whereby the lifespan of a hood is maximized by mounting a replaceable hood top on the hood disposed opposite to a reel foot so that weak parts of the hood can be easily replaced in order to prevent damage to a reel due to friction or shock when a fishing rod with the reel is fixed on the ground or the like during fishing, and scratch resistance and shock-absorbing ability are increased by making a hood top of a specific material, thereby improving the commercial value of a reel by providing various choices of hood tops and providing a so-called DIY function for users.

Description of the Related Art

The applicant(s) has proposed in Korean Patent No. 10-0320405, titled "Side cover structure for fishing reel", a technology that can enable easy and quick manual operation or replacement of parts without using tools.

Further, in Korean Utility Model No. 20-0426604, titled "Side cover device for fishing reel", the applicant(s) has proposed a side cover coupler of a dual bearing reel for fishing that can be simply operated and provide stable coupling/decoupling of a side cover.

Further, in Korean Patent No. 10-1418029, titled "Reel for fishing", the applicant(s) has proposed a fishing reel equipped with a one-touch handle that allows a user to easily open and close a side cover to separate a spool for maintenance when fishing even on non-flat places such as on rocks on a seashore.

Further, the applicant(s) has proposed in Korean Patent No. 10-1492199, titled "Reel for fishing", a fishing reel equipped with a one-touch handle on a spool cover that allows a user to open/close a cover assembly so that the user can easily disassemble and separate the cover assembly including a side cover and a spool cover combined with a reel body when replacing a spool in a bad fishing environment, for example, on rocks on a seashore.

The present invention is a result from the development of the various fishing reels that have been proposed by the applicant(s) and can lead satisfying demands of consumers, for example, improvement of durability, security of a lifespan, and security of various external appearances of fishing reels.

On the other hand, users generally grip a fishing rod with the index finger, the middle finger, the ring filter, and the little finger and hold the thumb rest of a fishing reel when they fish.

When a user holds a fishing reel in this way, he/she holds the fishing rod with four fingers, but the fishing reel only with one finger, so it is relatively difficult to strongly hold the fishing reel and the thumb is likely to slip on the fishing reel.

Accordingly, recently, fishing reels equipped with an anti-slip means on the thumb rest of a reel body to prevent the user from dropping a fishing reel due to sliding of his/her thumb have been proposed.

The most typical way of making an anti-slip means is to make the thumb rest of a frame in the shape corresponding to a thumb.

However, users not only have different lengths and sizes of fingers, but hold a fishing rod at different handle angles, so fixing a thumb rest in the shape of a thumb makes it relatively difficult to hold a fishing reel and easily causes sliding.

As another way of making an anti-slip means, there is a method of forming prominences and depressions on the thumb rest of a frame, but it is difficult to expect the anti-sliding effect from these prominences and depressions due to the individual differences of users.

Further, there is another method of attaching an anti-slip means pad to the thumb rest of a frame and the portion with which a thumb comes in contact in order to solve this problem.

However, the anti-slip means pad is attached to the surface of a frame by an adhesive, so the anti-slip means pad easily comes off due to the characteristic of an adhesive that is weak to water, is easily separated by the thumb when a user strongly holds a fishing reel, and still doesn't effectively provide an anti-slip surface.

Meanwhile, a method of additionally coupling a name plate, on which the model name or the manufacture name of the product is embossed, to a frame in order to prevent sliding is recently the most generally used. However, since it is impossible to bolt name plates due to the structural characteristics of frames, name plates are mostly bonded by an adhesive, so the same problem as the anti-slip means pad still remains. Further, dirt is easily stuck in the recessions of embossed name plates, so it is difficult to maintain fishing rods and the external appearance of the fishing rods is also deteriorated.

SUMMARY OF THE INVENTION

Accordingly, an object of the present invention is to provide a fishing reel equipped with a replaceable hood top, whereby the lifespan of a hood is maximized by mounting a replaceable hood top on the hood disposed opposite to a reel foot so that weak parts of the hood can be easily replaced in order to prevent damage to a reel due to friction or shock when a fishing rod with the reel is fixed on the ground or the like during fishing, and scratch resistance and shock-absorbing ability are increased by making a hood top of a specific material, thereby improving the commercial value of a reel by providing various choices of hood tops and providing a so-called DIY function for users.

Another object of the present invention is to provide a fishing reel of which scratch resistance, durability, and reel protection effect are maximized because a replaceable hood top coupled to coupling portions of a hood protrudes upward from the hood top.

Another object of the present invention is to provide a fishing reel in which a replaceable hood top has a link at a thumb rest position and a plurality of insertion projections each having a fastening hole and protruding downward, so convenient assembly and replacement can be ensured.

Another object of the present invention is to provide a fishing reel in which a replaceable hood top has two branches opposite to the link, tails extending over or beyond a clutch lever, and skirts protruding downward from a flange, the hood top can cover as large of an area as possible, whereby it is possible to further protect the reel and firmly assemble the reel.

Another object of the present invention is to provide a fishing reel in which a name plate and/or an anti-slip member for preventing slip is not bonded, a separate anti-slip member is fixed by a hood or a hood top, and the anti-slip member is replaceable, so it is possible to satisfy various demands of consumers such as improvement of the durability of a fishing reel and security of a lifespan and various external designs in addition to be basic function of preventing slip.

In order to achieve the objects, a fishing reel according to the present invention includes: a frame having a mount; two side covers coupled to both sides of the frame; a spool disposed inside the mount of the frame and coupled to the side covers through a shaft; a reel foot coupled to a bottom of the frame to be mounted on a fishing rod; a hood coupled to a top of the frame; a handle coupled to a side of the frame through a shaft to rotate the spool; and a tension nut disposed on a side of the frame to adjust a casting distance by controlling a rotational speed of a spool shaft, in which the hood has coupling portions, and a replaceable hood top is coupled to the coupling portions.

The replaceable hood top may protrude from the hood when being combined with the hood.

The replaceable hood top may have a link at a thumb rest position and a plurality of insertion projections each having a fastening hole and protruding downward, and grooves in which the insertion projections are inserted may be formed at the coupling portions of the hood.

The hood top may have two branches opposite to the link, the branches may each have a tail extending over or beyond a clutch lever coupled to the frame, and the hood top may have skirts protruding downward from a flange.

The fishing reel may further include an anti-slip member having contact portions at a thumb rest position, in which the hood may have seats formed through the hood to correspond to the contact portions, and when the hood is coupled to the top of the frame to cover the anti-slip member, the contact portions may be inserted and exposed through the seats.

The fishing reel may further include a hood top coupled to a top of the hood, in which the hood may have contact portions that are anti-slip portions at a thumb rest position, the hood top may have seats formed through the hood top to correspond to the contact portions, and when the hood top is coupled to the top of the hood to cover to hood, the contact portions may be inserted and exposed through the seats.

The fishing reel may further include an anti-slip member having contact portions at a thumb rest position, in which the hood may have seats formed through the hood to correspond to the contact portions, and when the hood is coupled to the top of the anti-slip member to cover the anti-slip member, the contact portions may be inserted and exposed through the seats.

According to the fishing reel equipped with a replaceable hood top of the present invention, the lifespan of the hood can be maximized by mounting a replaceable hood top on a hood disposed opposite to a reel foot so that weak parts of the hood can be easily replaced in order to prevent damage to a reel due to friction or shock when a fishing rod with the reel is fixed on the ground or the like during fishing; scratch resistance and shock-absorbing ability can be increased by making a hood top of a specific material; and the commercial value can be improved by providing various choices of hood tops and providing a so-called DIY function for users. Further, since the replaceable hood top coupled to the coupling portions of the hood protrudes upward from the hood, scratch resistance, durability, and a reel protection effect are maximized. Furthermore, since the replaceable hood top has a link at a thumb rest position and a plurality of insertion projections each having a fastening hole and protruding downward, convenient assembly and replacement can be ensured. In addition, since the replaceable hood top has two branches opposite to the link, tails extending over or beyond a clutch lever, and skirts protruding downward from a flange, the hood top can cover as large of an area as possible, whereby it is possible to further protect the reel and firmly assemble the reel.

Further, according to the fishing reel of the present invention, since the contact portions of an anti-slip member for preventing slip in use are fixed to the frame by a hood or a hood top for protecting the frame, a user can more stably hold a fishing reel regardless of individual differences such as the finger lengths and the angle of a hand holding the fishing reel, and particularly, slip at a thumb rest passion of a fishing reel that is held by a thumb is prevented. Furthermore, when a user places a fishing rod with a fishing reel on the ground during fishing, it is possible to primarily prevent damage to the fishing reel due to friction or shock.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminologies used herein are for the purpose of describing particular aspects (or embodiments) only and are not intended to be limiting of the present invention. As used herein, the singular forms are intended to include the plural forms as well, unless the context clearly indicates otherwise.

It will be further understood that the terms "comprises," "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive element, but constitutive elements should not be limited to a manufacturing order, and the terms described in the detailed description of the invention may not be consistent with those described in the claims In the following description of a fishing reel equipped with an anti-slip member according to the present invention, unclear directions are specified on the basis of FIG. 1 for the convenience of description. The front of a level winder W is defined as the front direction, and the up, down, left, and right directions are defined with respect to the front direction with the gravity direction as the downward direction, as seen in the figure. Further, unless specifically stated, these directions are applied in the same way to other figures and the following description and claims.

A fishing reel according to the present invention is described hereafter with reference to the accompanying drawings.

Figure 6:
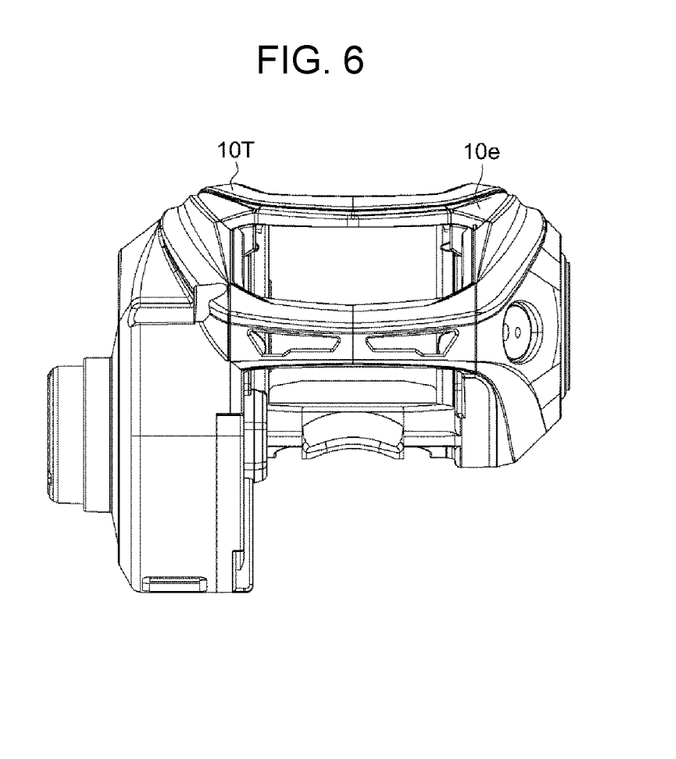
FIG. 6 is a front view of the present invention.
Figure 7:
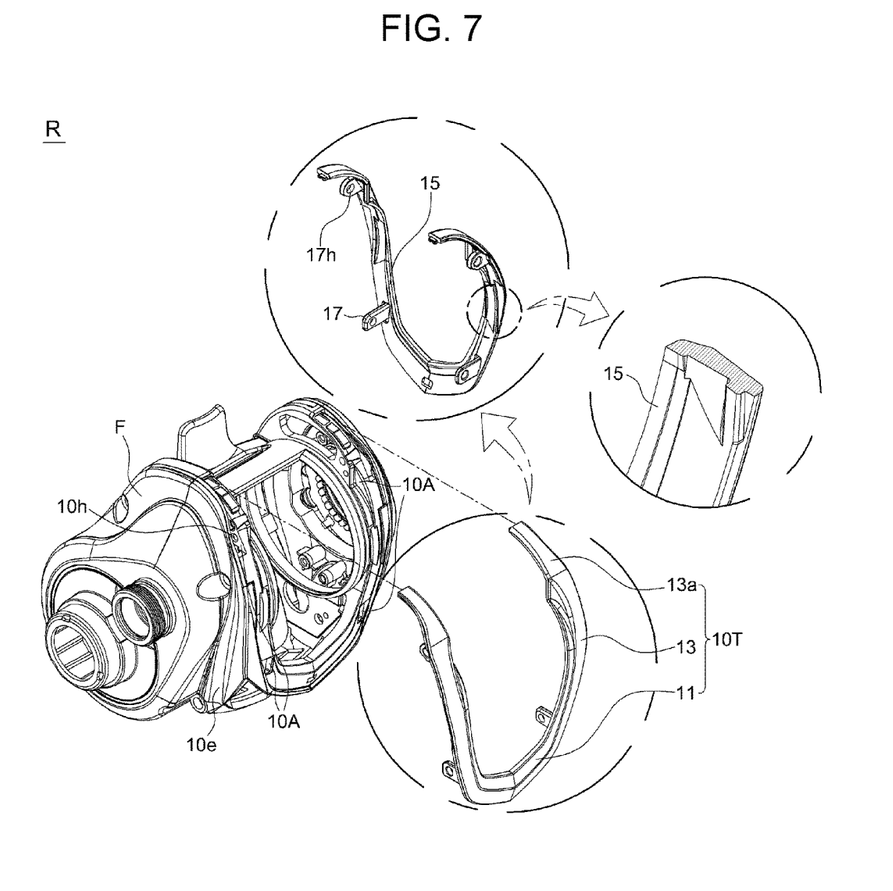
FIG. 7 is an exploded perspective view of the present invention.
Figure 8:
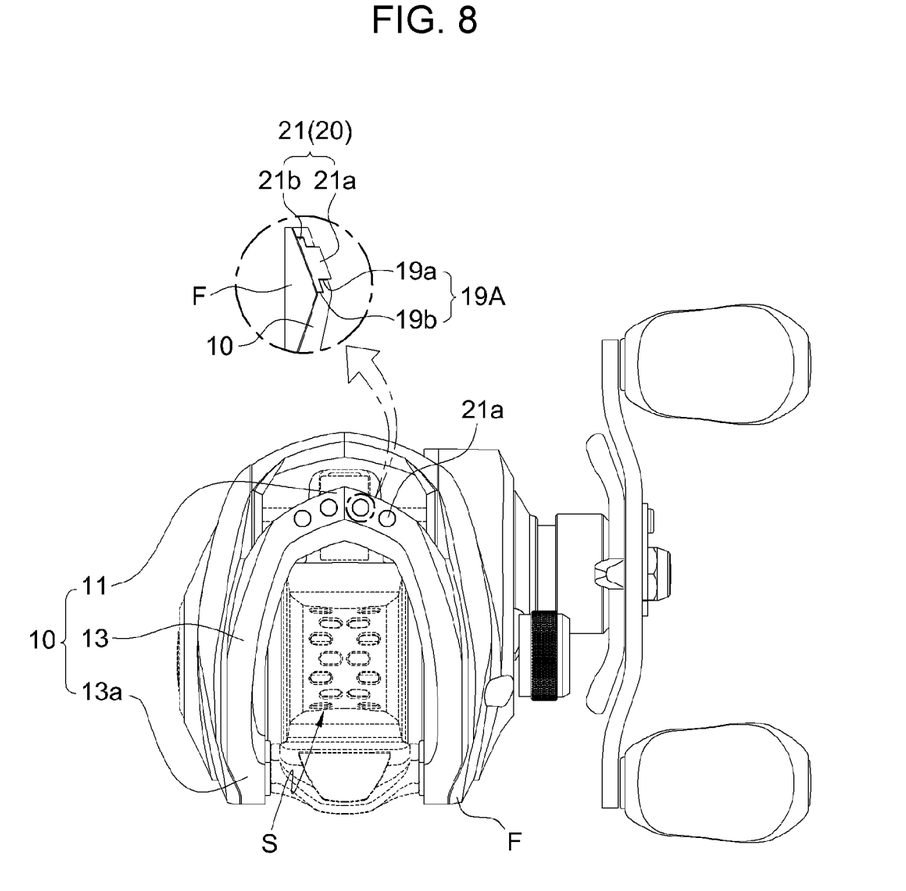
FIGS. 8 to 10 are plan views showing a first embodiment of the present invention.
Figure 9:
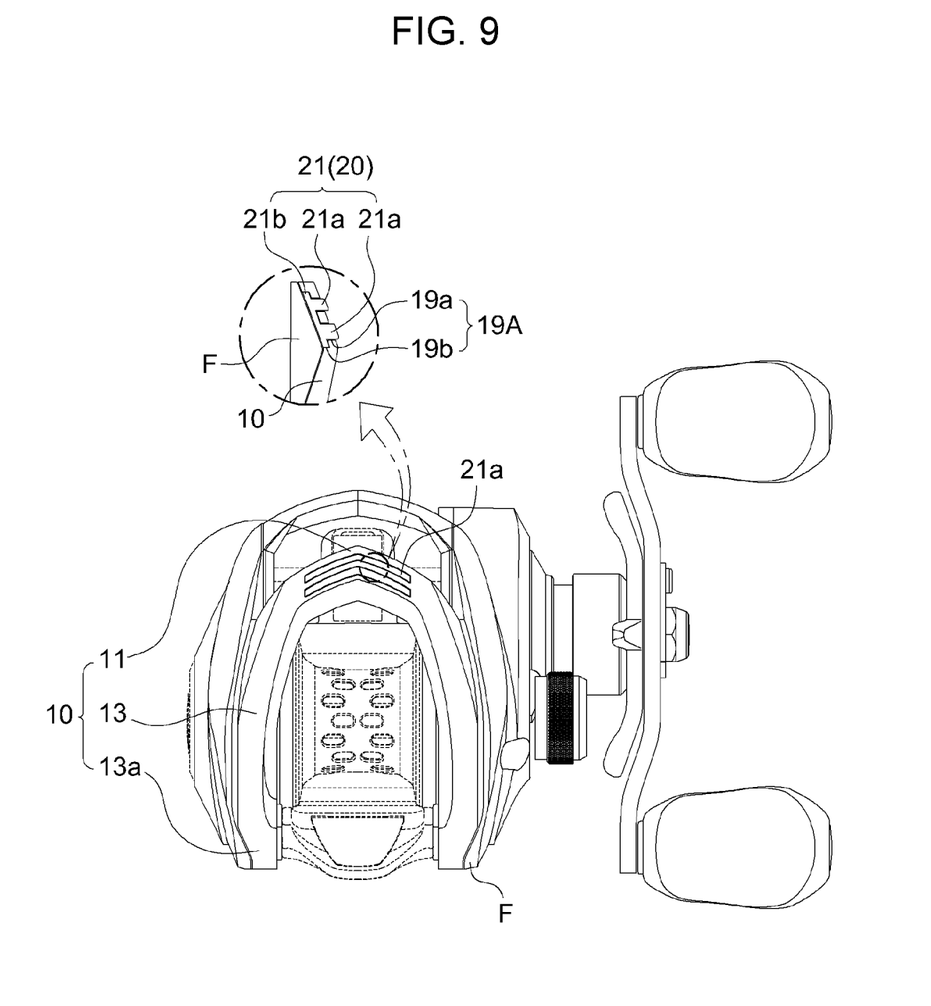
Figure 10:
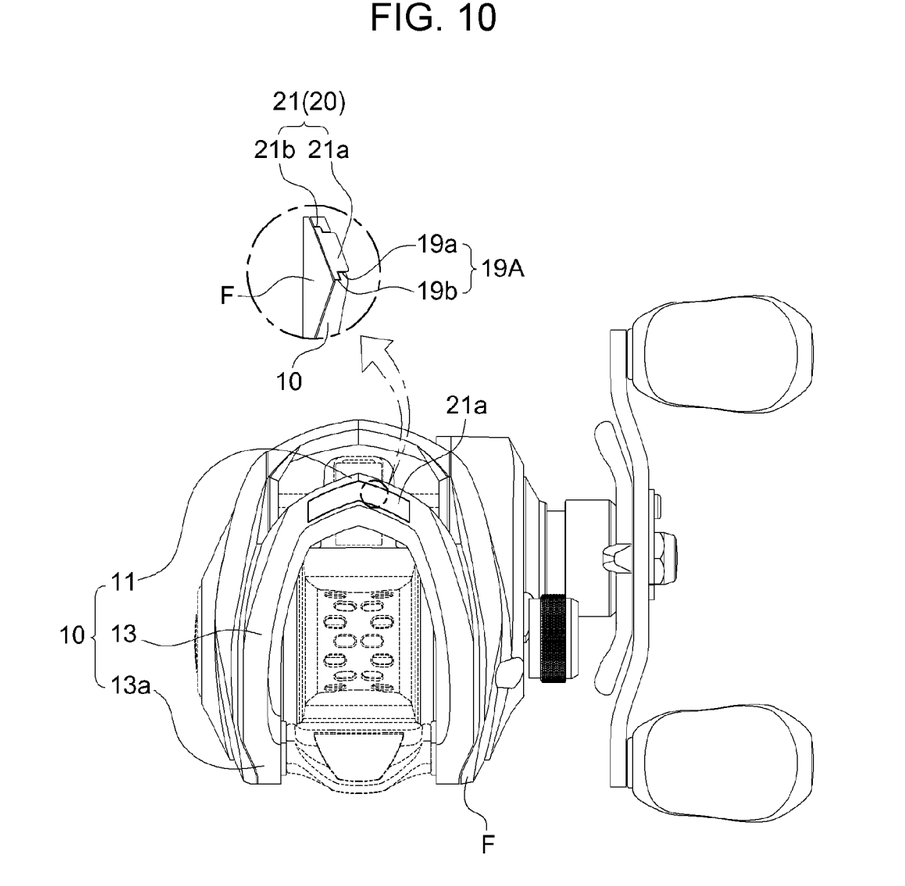
Figure 11:
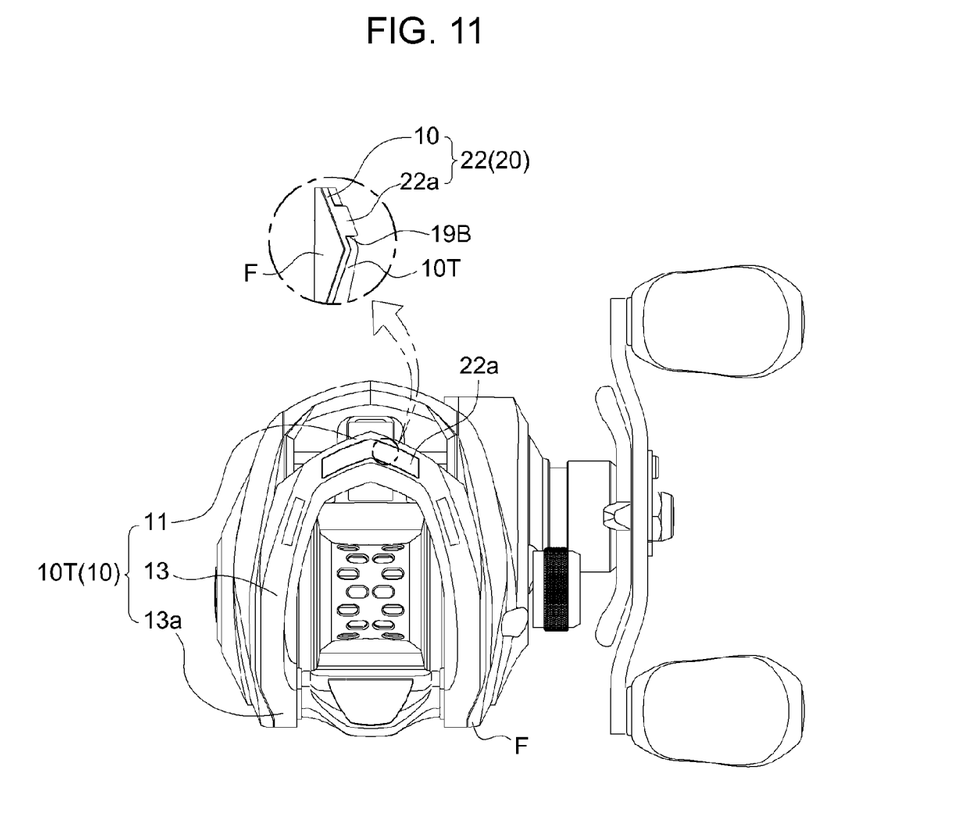
FIG. 11 is a plan view showing a second embodiment of the present invention.
Figure 12:
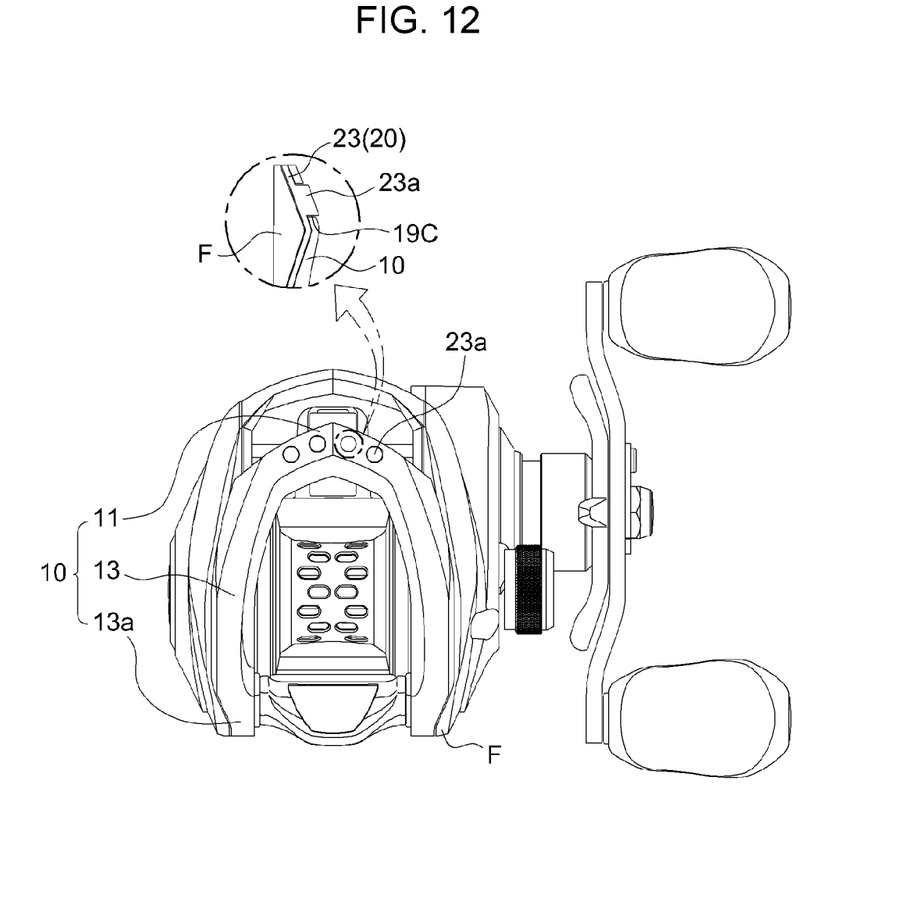
FIGS. 12 to 13 are plan views showing a third embodiment of the present invention.
Figure 13:
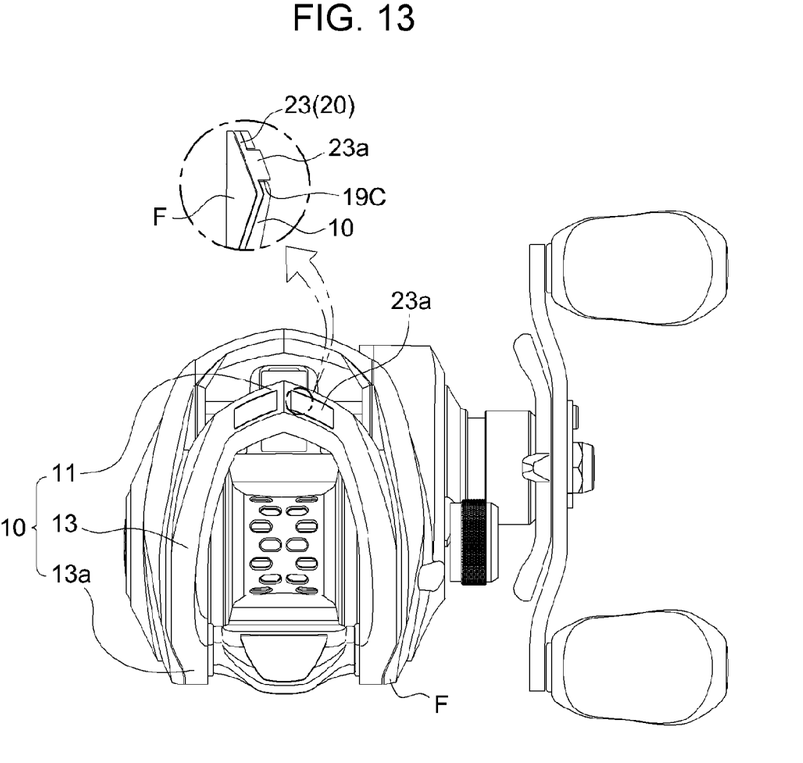

FIGS. 1 to 7 are views illustrating common configuration of embodiments (for convenience of understanding, a handle H, a spool S, a tension nut Nt, a star drag nut Nd, a clutch lever L, and an anti-slip member 20 are not shown in FIGS. 3 to 7), FIGS. 8 to 10 are views related to a first embodiment of the present invention, FIG. 11 is a view related to a second embodiment, and FIGS. 12 and 13 are views related to a third embodiment of the present invention.

Features and detailed structures related to a hood 10 and a hood top 10T that are common parts of the first to third embodiments are described with reference to FIGS. 1 to 7 and features of anti-slip members 20 of the embodiments are described with reference to FIGS. 8 to 13.

As shown in the figures, a fishing reel equipped with an anti-slip member according to the present invention includes: a frame F having a mount Fm; two side covers F1 and F2 coupled to both sides of the frame F; a spool S disposed inside the mount Fm of the frame F and coupled to the side covers F1 and F2 through a shaft; a reel foot F3 coupled to the bottom of the frame F to be mounted on a fishing rod; a handle H coupled to a side of the frame F through a shaft to rotate the spool S; a tension nut Nt disposed on a side of the frame F to adjust a casting distance by controlling the rotational speed of a spool shaft HS; and an anti-slip member 20 having contact portions 21, 22*a*, and 23*a* for preventing user's fingers from slipping.

In detail, as shown in FIGS. 1 to 7, the frame F has two side covers at both sides, that is, a first side cover F1 (a left cover or a palm side cover) and a second side cover F2 (a right side cover or a gear side cover) and the spool S is disposed inside the mount Fm of the frame and coupled to the side covers F1 and F2 through a shaft.

Further, a star drag nut Nd is disposed on the spool shaft HS for adjusting 'drag power' for protecting a fishing line by reducing the speed of the fishing line unwound from the spool when a fish flees with a hook in its mouth.

Figure 1:
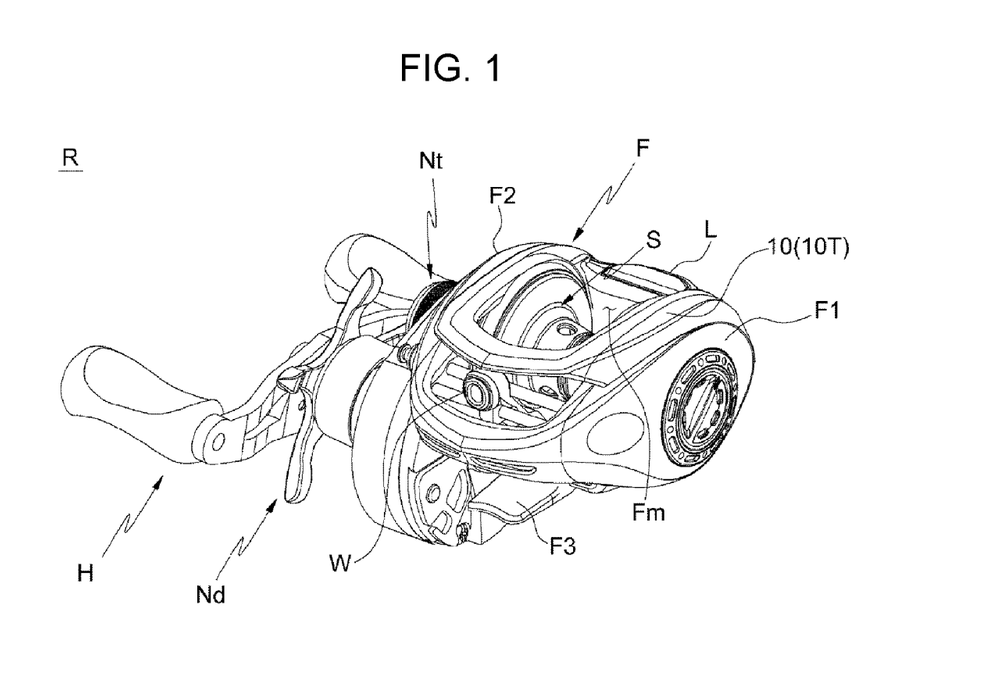
FIG. 1 is a perspective view of the present invention.
Figure 2:
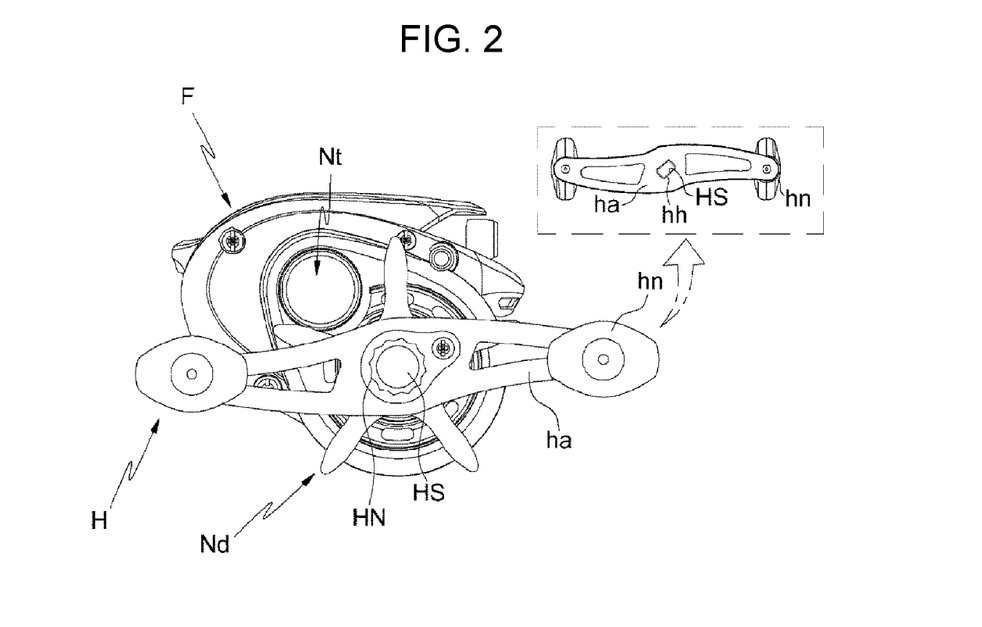
FIG. 2 is a side view of the present invention.
Figure 3:
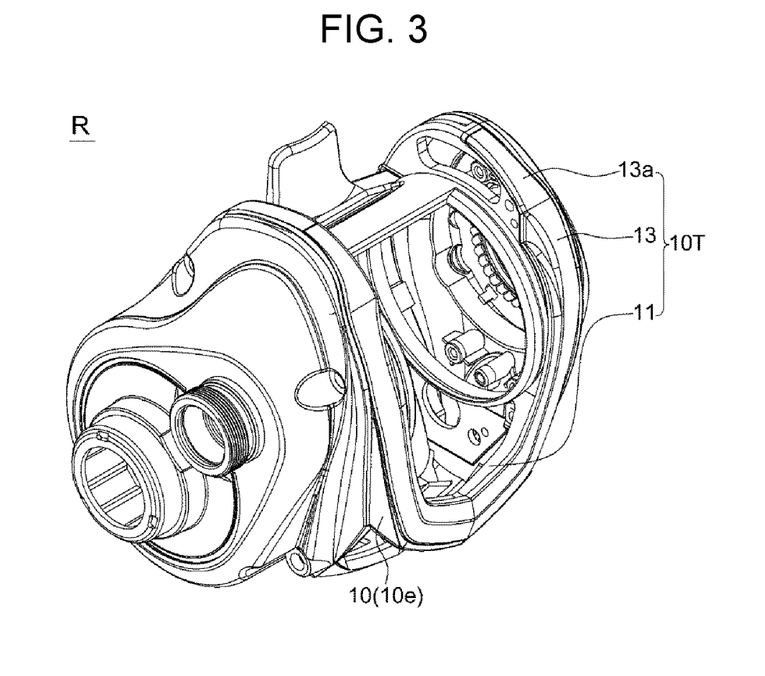
FIG. 3 is a perspective view of the present invention.
Figure 4:
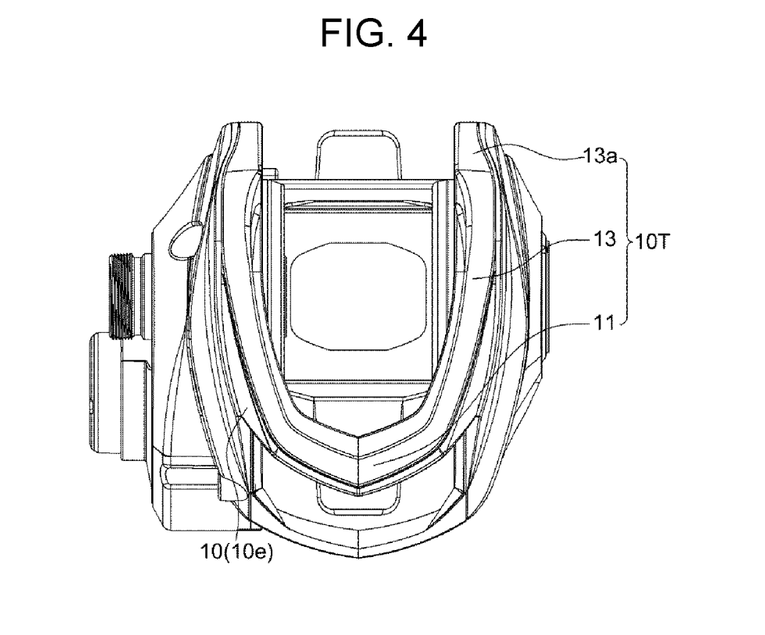
FIG. 4 is a plan view of the present invention.

In the fishing reel R, particularly, in a bait reel, as can be seen from FIG. 1, the dotted line block at the right side in FIG. 2, and FIG. 3, the handle H is composed of a handle shaft HS, a handle arm ha, handle knobs hn, and a handle nut HN.

The handle shaft HS is operated with the spool S and has a male-threaded portion at an end.

The handle arm ha has a coupling hole hh (see FIG. 2) that is fitted on a male threaded-portion having an anti-idling non-circular structure for a flat portion of the handle shaft and the handle nut HN fixes the handle arm ha by being fitted on the male-threaded portion of the handle shaft The handle knobs hn are disposed at ends, particularly, both ends of the handle arm ha.

Further, the reel foot F3 is coupled to the bottom of the frame F to be mounted on a fishing rod and a hood 10 is coupled to the top of the frame F.

Further, the fishing reel R according to the present invention includes a level winder W that makes a fishing line be uniformly wound on the spool S at the front (see FIG. 1).

Further, the fishing reel includes a clutch lever L disposed opposite to the level winder W at the rear to allow the spool to be rotated only in the winding direction of the fishing line by allowing for rotation of the spool in casting and stopping rotation of the spool only when the handle is rotated to wind the fishing line by controlling the rotation of the spool S.

Further, another main characteristic of the fishing reel according to the present invention is to mount a replaceable hood top 10T on the hood 10 coupled to the top of the frame F, as in the second embodiment, to protect the reel body R.

When a user places a fishing rod with a reel on the ground or on a rock during fishing, the gear side cover F2, the handle H, and the star drag nut Nd that are relatively heavy are brought in contact with the ground or a rock and are likely to be damaged.

On the contrary, when a fishing rod is placed with a reel R on the ground, the frame F or the side covers F1 and F2, and the handle H and the star drag nut Nd are brought in contact with the ground and are likely to be damaged.

In the latter case, when the hood 10 is disposed on the top of the frame F, damage to the frame F or the side covers F1 and F2 can be relatively prevented.

Nevertheless, integrated hoods are generally designed to cover a level winder W (which is referred to as front covers), so the size is large, and thumb rests over the level winder W are usually made thick to ensure strength because they are the portions with which the user's thumb comes in contact and to which force is applied.

Accordingly, since integrated hoods are focused on strength, it is difficult to expect sufficient scratch resistance or shock-absorbing ability from the integrated hoods, and accordingly, it is difficult to propose various designs that can ensure consumer desirability.

Therefore, according to the present invention, the hood 10 has coupling portions 10A (see FIG. 7) and a replaceable hood top 10T is fastened to the coupling portions.

According to the replaceable hood top 10T, it is possible to maximize the lifespan of a hood by allowing for easy replacement of easy-to-damage parts of the hood opposite to a reel foot by mounting the replaceable hood top on the hood. Further, it is possible to increase scratch resistance and shock-absorbing ability by making the hood top of a specific material. Furthermore, it is possible to improve the commercial value by providing various choices of hood tops for users, that is, providing so-called DIY (Do It Yourself) or (tuning) function.

Further, by employing the replaceable hood top, it is possible to use high-strength materials for a thumb rest and ensure the ability to protect a hood and provide various designs of the hood top.

Figure 5:
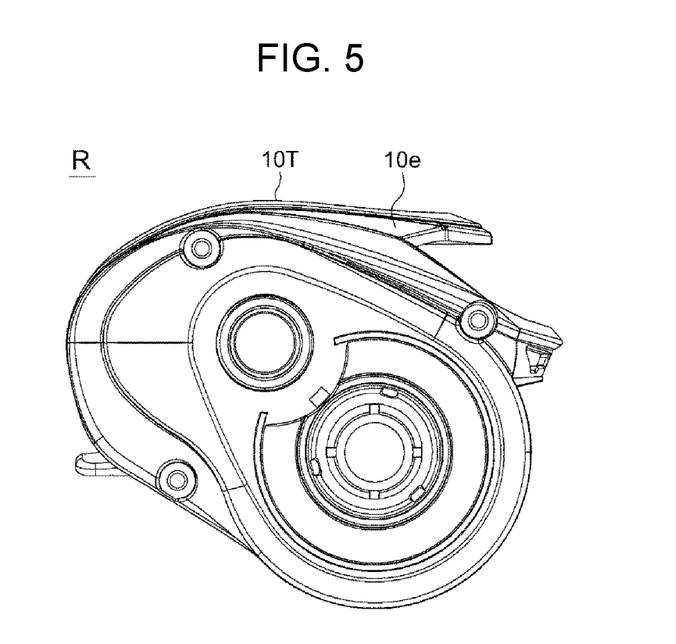
FIG. 5 is another side view of the present invention.

Next, the hood top protrudes from the hood 10 (the frame F) in the fishing reel R according to the present invention, as can be seen from FIGS. 5 and 6, so the frame and the side covers can be further protected.

Further, the replaceable hood top 10T of the present invention has a link 11 at the thumb rest position and two branches 13 formed opposite to the link 11.

In particular, the branches 13 each have a tail 13a extending over or beyond the clutch lever L coupled to the frame F so that the frame F comes in contact with the ground as little as possible, thereby minimizing the possibility of damage to the frame etc.

Further, as can be seen from the two circles of dashed dotted lines at the upper part in FIG. 7, the replaceable hood top 10T has skirts 15 protruding downward from a flange, so it can further protect the frame or the hood and improves the external appearance, whereby the design characteristic of the hood top is enhanced. In addition, the hood top is combined without a gap from the hood or the frame to prevent dirt from being stuck in the gap.

The skirt 15 shown in FIG. 7 further protrudes downward particularly at the mount Fm (see FIG. 1) of the frame for the spool S.

Meanwhile, the replaceable hood top 10T of the present invention has a plurality of insertion projections 17 each having a fastening hole 17h and protruding downward, as shown in FIG. 7, for easy assembly and replacement, and the coupling portions 10A of the hood 10 are grooves in which the insertion projections 17 are inserted and counter-fastening holes 10h are formed in the grooves for bolting.

In particular, two insertion projections are formed close to the link 11 of the hood top 10T and by two insertion projections are foiled close to the tails 13a of the branches 13 to ensure firm combination.

The characteristics of anti-slip members 20 of embodiments are described hereafter with reference to FIGS. 8 to 13.

Anti-slip members 20 shown in FIGS. 8 to 13 (the hood 10 in FIG. 11) respectively have contact portions 21a, 22a, 23a protruding a predetermined height from the surface of the reel body R, particularly, at the thumb rest portion where a user's thumb comes in contact of the reel body R to prevent a user's hand from slipping.

The anti-slip members according to the first to third embodiments are different types. That is, the first embodiment shown in FIGS. 8 to 10 is a fixed type in which an anti-slip member 21 having contact portions 21a is protected and fixed by a hood 10 coupled to the top of a frame F.

The second embodiment shown in FIG. 11 is a hood-integrated type in which a hood 10 having contact portions 22a that are the anti-slip portion of an anti-slip member 22 are protected and fixed by a hood top 10T coupled to the top of the hood 10.

The third embodiment shown in FIGS. 12 and 13 is an entire-fixed type in which an anti-slip member 23 having contact portions 23a having the same structure as the contact portions 22a of the hood-integrated type of the second embodiment is protected and fixed by a hood 10 coupled to the top of the anti-slip member 23.

First, the anti-slip member 21 of the first embodiment shown in FIGS. 8 to 10 has first contact portions 21a at a thumb rest position.

The hood 10 has first seats 19A formed through the hood 10 to correspond to the first contact portions 21a.

When the hood 10 is coupled to the top of the frame F to cover the anti-slip member 21, the first contact portions 21a are inserted and exposed through the first seats 19A.

The anti-slip member 21 has a ⊥ or ⊥-shape composed of the first contact portions 21a that are relatively small in area and a support portion 21b that is relatively large in area, in which the first contact portions 21a protrude further than the surface of the reel body R through the first seats 19A of the hood 10 to make stepped portions on the surface of the reel body R, thereby preventing slip of the fishing reel during fishing.

The anti-slip member 21 is made of rubber or silicon, or PVCs having relatively large friction.

A plurality of first circular contact portions 21a laterally spaced at a predetermined distance from each other is formed on one support portion 21b in FIG. 8.

A plurality of first contact portions 21a having an almost '-' shape and spaced at a predetermined distance in the front-rear direction from each other is formed on one support portion 21b in FIG. 9.

One first contact portion 21a having predetermined lateral length and front-rear width is formed on one support portion 21b in FIG. 10.

The anti-slip member 21 may be provided not only at the link 11 of the hood 10, but at one of the branches 13 disposed opposite to the link 11 (the left branch 13 for a right-handed fishing reel) or both of the branches 13 (see FIG. 11).

In order to fix the anti-slip member 21, the first seats 19A of the hood 10 for fixing the anti-slip members 21 each have a fitting hole 19a vertically formed in a shape corresponding to the first contact portions 21a of the anti-slip member 21 and an insertion groove 19b formed on the rear side of the hood 10 so that the support portions 21b are inserted therein.

When the hood 10 is combined with the frame F, the support portion 21b of the anti-slip member 21 is fitted between the frame F and the hood 10, whereby the anti-slip member 21 is fixed.

Next, the anti-slip member 22 of the second embodiment shown in FIG. 11, unlike the first embodiment, is a hood-integrated type in which second contact portions 22a that are the anti-slip portions of the anti-slip member 22 protrude from the surface of the hood 10 at a thumb rest position.

In this case, a hood top 10T coupled to the top of the hood 10 is further included.

The hood top 10T has second seats 19B formed through the hood top 10T to correspond to the second contact portions 22a.

When the hood top 10T is coupled to the top of the hood 10 to cover the hood 10, the second contact portions 22a are inserted and exposed through the second seats 19B.

The second embodiment is basically similar to the first embodiment in that slip is prevented by stepped portions between the second contact portions 22a and the surface of the reel body R.

However, the second embodiment is different from the first embodiment in that since the second contact portions 22a are integrally formed with a hood, the second seats 19B each have only a fitting hole in which the second contact portion 22a is fitted and it has a double hood structure with the hood top 10T on the hood 10.

Similar to the first embodiment, there is no restriction in the number, shape, arrangement, and shape of the second contact portions 22a in the second embodiment.

It can be seen from FIG. 11 that second contact portions 22a similar in shape to the first contact portions 21a are exposed through all of the link 11 and both branches 13 of the hood top 10T.

Next, the anti-slip member 23 of the third embodiment shown in FIGS. 12 and 13 has third contact portions 23a protruding in a similar structure to the second contact portions 22a of the hood 10 in the second embodiment.

A hood 10 is coupled to the top of the anti-slip member 23.

The hood 10 has seats 19C formed through the hood 10 to correspond to the third contact portions 23a.

When the hood 10 is coupled to the top of the anti-slip member 23, the first contact portions 23a are inserted and exposed through the seats 19C.

That is, the second embodiment and the third embodiment are basically similar in that the hood 10 having the second contact portions 22a and the hood top 10T are formed and coupled in the same structure as the anti-slip member 23 having the third contact portions 23a and the hood 10 and slip is prevented by the stepped portions between the third contact portions 23a and the surface of the reel body R.

However, the second and third embodiments are different in that the hood 10 and the hood top 10T are made of the same material in the second embodiment, whereas the anti-slip member 23 and the hood 10 are made of different materials, that is, rubber or silicon, or PVCs having a relatively large friction in the third embodiment.

Similar to the other embodiments, there is no restriction in the number, shape, arrangement, and shape of the third contact portions 23a in the third embodiment.

It can be seen from FIG. 12 that the third contact portions 23a similar in shape to the first contact portions 21a shown in FIG. 8 are exposed through the link 11 of the hood 10 and it can be seen from FIG. 13 that the third contact portions 23a different in shape from those shown in FIG. 12 are exposed through the link 11 of the hood 10.

According to the fishing reel of the present invention having the first to third embodiments having the structures described above, the contact portions 21a, 22a, and 23a protrude from the surface of the reel body R (that is, the surface of the hood 10 in the first and third embodiments and the surface of the hood top 10T in the second embodiment) to form stepped portions on the surface of the reel body R, thereby preventing slip of the fishing reel during use.

In particular, as in the first to third embodiments shown in the figures, since the contact portions 21a, 22a, and 23a are not fixed at specific positions or not bonded to the top of the frame F and a name plate is not used, users can generally hold and use the fishing reel without slippage regardless of individual differences such as finger lengths, the finger sizes, and the angles of the hand holding the fishing reel.

Further, it is possible to replace the anti-slip members 20 or the hood 10 having the contact portions 22a by separating the hood 10 and/or the hood top 10T, and it is possible to easily replace parts that are likely to be damaged. Furthermore, since it is possible to select various types of anti-slip members, hoods, and hood tops, it is possible to provide a so-called DIY function and satisfy various demands of consumers such as improvement of the durability of a fishing reel and security of a lifespan and various external designs.

Although a fishing reel which has a specific shape and structure was described above with reference to the accompanying drawing, the present invention may be changed and modified in various ways by those skilled in the art and those changes and modifications should be construed as being included in the scope of the present invention.

What is claimed is:

1. A fishing reel comprising:
a frame having a mount;
two side covers coupled to both sides of the frame;
a spool disposed inside the mount of the frame and coupled to the side covers through a spool shaft;
a reel foot coupled to a bottom of the frame to be mounted on a fishing rod;
a hood coupled to a top of the frame;
a handle coupled to a side of the frame through a handle shaft to rotate the spool; and
a tension nut disposed on a side of the frame to adjust a casting distance by controlling a rotational speed of the spool shaft,
wherein the hood has coupling portions,
a replaceable hood top being coupled to the coupling portions has a link at a thumb rest position and a plurality of insertion projections each having a fastening hole and protruding downward, and
grooves in which the insertion projections are inserted are formed at the coupling portions of the hood.

2. The fishing reel of claim 1, wherein the hood top has two branches opposite to the link,
the branches each have a tail extending over or beyond a clutch lever coupled to the frame, and
the hood top has skirts protruding downward from a flange.

3. The fishing reel of claim 1, further comprising an anti-slip member having contact portions at a thumb rest position,
wherein the hood has seats formed through the hood to correspond to the contact portions, and
when the hood is coupled to a top of the anti-slip member to cover the anti-slip member, the contact portions are inserted and exposed through the seats.

4. The fishing reel comprising:
a frame having a mount;
two side covers coupled to both sides of the frame;
a spool disposed inside the mount of the frame and coupled to the side covers through a spool shaft;
a reel foot coupled to a bottom of the frame to be mounted on a fishing rod;
a hood coupled to a top of the frame;
a handle coupled to a side of the frame through a handle shaft to rotate the spool;
a tension nut disposed on a side of the frame to adjust a casting distance by controlling a rotational speed of the spool shaft; and
an anti-slip member having contact portions at a thumb rest position,
wherein the hood has coupling portions and seats formed through the hood to correspond to the contact portions, a replaceable hood top is coupled to the coupling portions, and when the hood is coupled to the top of the frame to cover the anti-slip member, the contact portions are inserted and exposed through the seats.

5. The fishing reel comprising:

a frame having a mount;

two side covers coupled to both sides of the frame;

a spool disposed inside the mount of the frame and coupled to the side covers through a spool shaft;

a reel foot coupled to a bottom of the frame to be mounted on a fishing rod;

a hood coupled to a top of the frame;

a handle coupled to a side of the frame through a handle shaft to rotate the spool; and a tension nut disposed on a side of the frame to adjust a casting distance by controlling a rotational speed of the spool shaft, wherein the hood having coupling portions has contact portions that are anti-slip portions at a thumb rest position, a replaceable hood top is coupled to the coupling portions and has seats formed through the hood top to correspond to the contact portions, and when the hood top is coupled to a top of the hood to cover the hood, the contact portions are inserted and exposed through the seats.

\* \* \* \* \*